United States Patent [19]
Coran et al.

[11] Patent Number: 5,936,038
[45] Date of Patent: Aug. 10, 1999

[54] VULCANIZABLE ELASTOMERIC COMPOSITION AND THERMOPLASTIC VULCANIZATE EMPLOYING THE SAME

[75] Inventors: Aubert Y. Coran; Oansuk Chung, both of Akron, Ohio

[73] Assignee: The University of Akron, Akron, Ohio

[21] Appl. No.: 08/689,455

[22] Filed: Aug. 9, 1996

[51] Int. Cl.⁶ ..................................... C08L 9/02
[52] U.S. Cl. ..................... 525/142; 525/132; 525/139; 525/205; 525/218; 525/331.9; 525/384
[58] Field of Search ..................... 525/142, 205, 525/218, 132, 139, 331.9, 384

[56] References Cited

U.S. PATENT DOCUMENTS

| | | |
|---|---|---|
| 3,377,315 | 4/1968 | Ashton et al. . |
| 3,658,769 | 4/1972 | Kline . |
| 3,767,628 | 10/1973 | Kline . |
| 3,928,296 | 12/1975 | Kavchok . |
| 3,975,414 | 8/1976 | Kline . |
| 4,123,411 | 10/1978 | Coran . |
| 4,125,515 | 11/1978 | Kuczkowski . |
| 4,130,535 | 12/1978 | Coran et al. . |
| 4,155,955 | 5/1979 | Parks . |
| 4,271,049 | 6/1981 | Coran et al. . |
| 4,299,931 | 11/1981 | Coran et al. ............................... 525/95 |
| 4,301,296 | 11/1981 | Kuczkowski ............................ 560/152 |
| 4,311,628 | 1/1982 | Abdou-Sabet . |
| 4,338,411 | 7/1982 | Coran et al. ............................ 525/145 |
| 4,354,007 | 10/1982 | Scott ....................................... 525/370 |
| 4,376,846 | 3/1983 | Kotani et al. ............................ 525/205 |
| 4,386,181 | 5/1983 | Kotani et al. ............................ 524/304 |
| 4,426,484 | 1/1984 | Saeki ....................................... 524/541 |
| 4,687,810 | 8/1987 | Coran ....................................... 525/74 |
| 4,739,014 | 4/1988 | Parks et al. .............................. 525/263 |
| 4,774,288 | 9/1988 | Ridland ................................... 525/133 |
| 4,806,447 | 2/1989 | Parker ..................................... 525/263 |
| 4,883,837 | 11/1989 | Zabrocki .................................. 525/66 |
| 4,942,238 | 7/1990 | Rytz et al. ............................... 546/242 |
| 5,043,455 | 8/1991 | Parker et al. ........................... 548/537 |
| 5,069,819 | 12/1991 | Sturm et al. ............................ 252/402 |
| 5,073,597 | 12/1991 | Puydak et al. .......................... 525/193 |
| 5,086,121 | 2/1992 | Hazelton et al. ....................... 525/197 |
| 5,200,469 | 4/1993 | Hous ....................................... 525/245 |
| 5,296,584 | 3/1994 | Walisser ................................. 528/163 |
| 5,311,628 | 5/1994 | Abdou-Sabet et al. . |
| 5,342,887 | 8/1994 | Bergström et al. ..................... 525/108 |
| 5,371,289 | 12/1994 | Cottman et al. ........................ 564/396 |
| 5,382,629 | 1/1995 | Coran et al. ............................ 525/194 |
| 5,397,832 | 3/1995 | Ellul ....................................... 524/515 |

FOREIGN PATENT DOCUMENTS 0 279 026 A2  10/1987  European Pat. Off. .

OTHER PUBLICATIONS

"Vulcanization of Butyle Rubber by p–Quinone Dioxime" by Gan et al., *Journal of Applied Polymer Science*, vol. 21, pp. 1771–1781 (1977).

"Vulcanization of Butyl Rubber by p–Quinone Dioxime Dibenzoate" by Gan and Chew, *Journal of Applied Polymer Science*, vol. 24, pp. 371–383, (1979).

"Rubber–Thermoplastic Compositions Part V. Selecting Polymers for Thermoplastic Vulcanizates" by Coran et al., presented at a meeting of the Rubber Division, American Chemical Society, Cleveland, Ohio, Oct. 13–16, 1981.

"Vulcanization: Conventional and Dynamic" by Coran, *Rubber Chemistry and Technology*, vol. 68, No. 3, Jul.–Aug. 1995.

"Butyl and Chlorobutyl by Rubber" by Zapp and Hous, *Rubber Technology*, Second Edition, pp. 249–273, (1973).

*Primary Examiner*—Fred Zitomer
*Attorney, Agent, or Firm*—Renner, Kenner, Greive, Bobak, Taylor & Weber

[57] ABSTRACT

A vulcanizable elastomer having at least one pendant reactive amino group. The elastomer is vulcanized by using a phenolic-resin curative essentially in the absence of an activation catalyst, to form a vulcanizate. Also provided is a thermoplastic elastomeric vulcanizable composition of matter, employing the elastomer having the pendent reactive amino group, which may be dynamically vulcanized without the use of an activation catalyst. Further provided is a method for vulcanizing an elastomer having at least one pendent reactive amino group by utilizing a phenolic vulcanizing agent without the use of a catalyst.

32 Claims, 1 Drawing Sheet

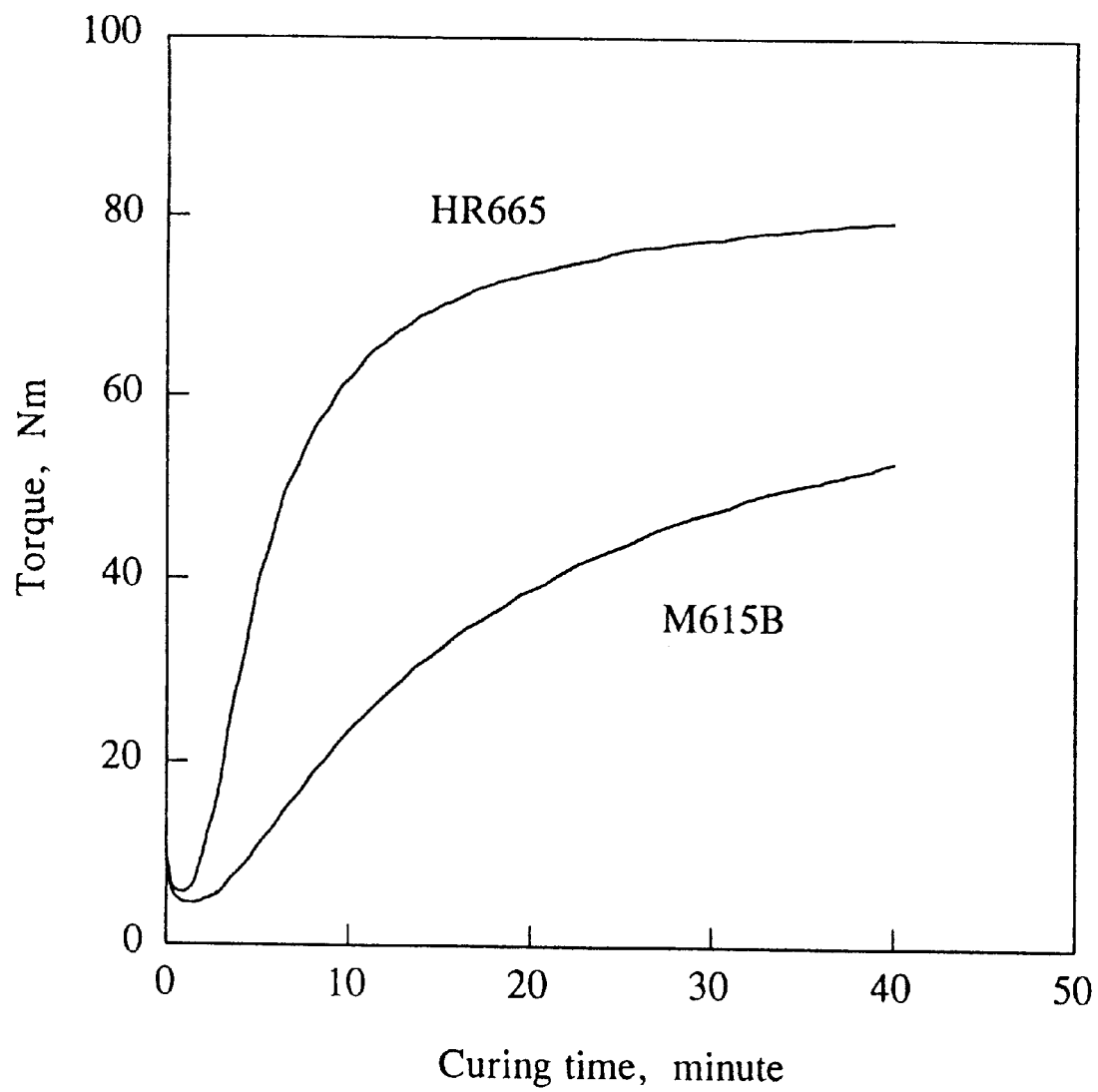

VULCANIZABLE ELASTOMERIC COMPOSITION AND THERMOPLASTIC VULCANIZATE EMPLOYING THE SAME

TECHNICAL FIELD

The present invention generally relates to a vulcanizable elastomeric composition and a method of vulcanizing the same. Particularly, this invention relates to vulcanizable elastomeric compositions containing an elastomer having a reactive amino group and a phenolic curing agent, the vulcanization being capable of occurring without the use of a catalyst. Also provided are thermoplastic vulcanizates employing the vulcanizable elastomers.

BACKGROUND OF THE INVENTION

Elastomers are polymeric materials characterized by their ability to quickly recover from large deformations. This elasticity is commonly increased by the vulcanization or cross-linking of the elastomer. Vulcanization is typically carried out with sulfur systems such as accelerated-sulfur vulcanization or with poly-functional resin systems such as phenol-formaldehyde-resin curatives.

For example, U.S. Pat. No. 4,774,288 employs resin systems to cure elastomers having low levels of unsaturation. As is commonly known in the art, this vulcanization is carried out in the presence of a catalyst to achieve proper cross-linking within a reasonable time. Typically, these catalysts include zinc oxide or Lewis-acid catalysts, such as stannous chloride, zinc chloride, or an equivalent thereto.

It is also common to blend elastomers with thermoplastic resins to achieve a thermoplastic elastomer. Thermoplastic elastomers are block copolymers or polymer blends characterized by their elastomeric properties, i.e. the ability to recover from deformation, as well as their thermoplastic properties, i.e., the ability to be melt-processed and reprocessed. For example, acrylonitrilebutadiene rubber (NBR) can be blended with polycaprolactam (nylon-6) to form a thermoplastic elastomer by dynamic vulcanization. Furthermore, a thermoplastic elastomer can comprise of a blend of a conventional elastomer with a thermoplastic elastomer such as an ether-ester block copolymer blended with polypropylene.

Typically, the elastomeric properties of thermoplastic elastomers are enhanced if the blend contains a vulcanizable elastomer that is cross-linked to some degree. These vulcanized thermoplastic elastomers are commonly referred to as thermoplastic vulcanizates, which are commonly produced by dynamic vulcanization. Dynamic vulcanization refers to the process whereby rubber is vulcanized during its melt-mixing with molten non-crosslinking plastic. As with the conventional vulcanization of unsaturated elastomers, the dynamic curing of unsaturated elastomers by phenolic-resin curatives requires an activation catalyst to achieve cross-linking within a reasonable time.

In many applications, however, it is undesirable to have catalysts present during the dynamic vulcanization or in the vulcanizate itself. The presence of catalysts is undesirable during dynamic vulcanization of a thermoplastic elastomer because the catalysts can catalyze undesirable reactions within the blend, particularly reactions with the non-vulcanizing thermoplastic employed. For example, certain metal halides have been known to cause transesterification when the non-vulcanizing polyesters or ester-ether block copolymers are used. Furthermore, some catalysts are corrosive and tend to degrade the thermoplastic ester polymer.

Thus, there is a need for a vulcanizable elastomeric composition which may be vulcanized in the absence of any Lewis-acid catalyst, zinc oxide, or an equivalent thereto, often referred to as activation catalysts.

SUMMARY OF INVENTION

It is therefore a primary object of the present invention to provide a vulcanizable composition of matter which may be vulcanized in the absence of an activation catalyst.

It is another object of the present invention to provide a method of vulcanizing an elastomer in the absence of an activation catalyst.

It is yet another object of the present invention to provide a vulcanizate prepared by cross-linking an elastomer with a phenolic-resin curative, wherein the cross-linking occurs without the use of an activation catalyst.

It is still another object of the present invention to provide a thermoplastic vulcanizate prepared by dynamically vulcanizing the rubber of a rubber-thermoplastic mixture with a phenolic-resin curative in the absence of an activation catalyst.

It is another object of the present invention to provide a method of preparing a thermoplastic vulcanizate in the absence of an activation catalyst.

At least one of the foregoing objects of the present invention together with the advantages thereof over existing vulcanizable compositions which shall become apparent from the specification which follows, are accomplished by the invention as hereinafter described and claimed.

In general, the present invention provides a vulcanizable composition of matter comprising: an elastomer, the molecules of the elastomer having at least one reactive amino group pendent from their backbone chains and having the general formula (I)

$$-Y_n-NH-R \qquad (I)$$

wherein R is selected from the group consisting of hydrogen, and organic radicals having up to 20 carbon atoms, and wherein Y is a divalent organic radical and n is zero or 1; and, a vulcanizing amount of a phenolic-resin curative of the general formula (V)

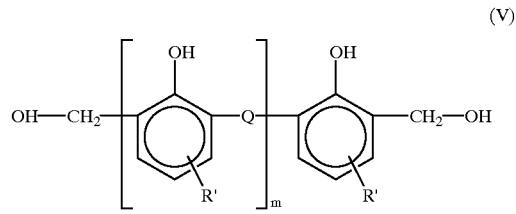

(V)

wherein Q is a divalent radical selected from the group consisting of —$CH_2$— and —$CH_2$—O—$CH_2$—; m is zero or a positive integer from 1 to 20 and R' is an organic radical; and, wherein the composition is capable of being vulcanized essentially in the absence of an activation catalyst.

The present invention also provides a method of vulcanizing an elastomer essentially in the absence of an activation catalyst comprising the step of blending the elastomer with a vulcanizing amount of a phenolic-resin curative essentially in the absence of an activation catalyst; the molecules of the elastomer containing at least one pendent reactive amino group of the general formula (I)

$$-Y_n-NH-R \qquad (I)$$

wherein R is selected from the group consisting of hydrogen, organic radicals n is zero or 1; and the phenolic-resin curative is defined according the formula (V)

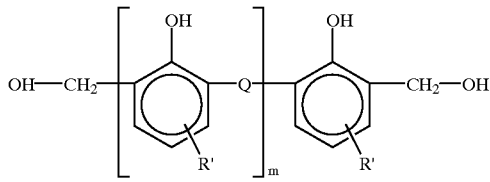
(V)

wherein Q is a divalent radical selected from the group consisting of —CH$_2$— and —CH$_2$—O—CH$_2$—; and m is zero or a positive integer from 1 to 20 and R' is an organic radical.

The present invention further provides a vulcanizate prepared by vulcanizing a composition comprising: an elastomer, the molecules of the elastomer having at least one pendent reactive amino group of the general formula (I)

(I)

wherein R is selected from the group consisting of hydrogen, and organic radicals having up to 20 carbon atoms, and wherein Y is a divalent organic radical and n is zero or 1; and a vulcanizing amount of a vulcanizing agent of the general formula (V)

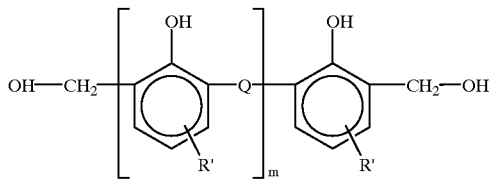
(V)

wherein Q is a divalent radical selected from the group consisting of —CH$_2$— and —CH$_2$—O—CH$_2$—; m is zero or a positive integer from 1 to 20 and R' is an organic radical; and, wherein the vulcanizate has been cross-linked essentially in the absence of an activation catalyst.

The present invention still further provides a thermoplastic vulcanizate prepared by vulcanizing a composition comprising: a rubber-thermoplastic blend comprising a vulcanizable elastomer, the molecules of the elastomer having at least one pendent reactive amino group of the general formula (I)

(I)

wherein R is selected from the group consisting of hydrogen, and organic radicals having up to 20 carbon atoms, and wherein Y is a divalent organic radical and n is zero or 1, and a thermoplastic non-vulcanizing polymer; and, a vulcanizing amount of a phenolic-resin curative of the general formula (V)

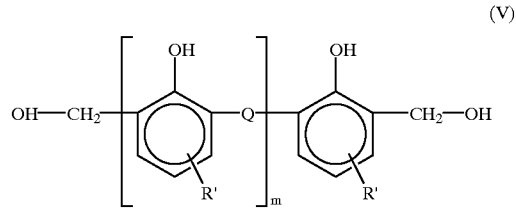
(V)

wherein Q is a divalent radical selected from the group consisting of —CH$_2$— and —CH$_2$—O—CH$_2$—; m is zero or a positive integer from 1 to 20 and R' is an organic radical; and, wherein the thermoplastic vulcanizate has been cross-linked essentially in the absence of an activation catalyst.

The present invention further provides a process for preparing a thermoplastic vulcanizate comprising the steps of: masticating a mixture of thermoplastic non-vulcanizing polymer and elastomer, the mixture containing between about 20 and about 2000 parts by weight thermoplastic non-vulcanizing polymer per hundred parts by weight rubber at a temperature sufficient to soften or melt the thermoplastic non-vulcanizing polymer, and for a time sufficient to obtain a homogeneous mixture in which the rubber is in the form of small dispersed particles essentially of a size smaller than about 50 μm wherein the molecules of the elastomer have at least one pendent reactive amino group of the general formula

(I)

wherein R is selected from the group consisting of hydrogen, and organic radicals having up to 20 carbon atoms, and wherein Y is a divalent organic radical and n is zero or 1; adding to the mixture a vulcanizing amount of phenolic-resin curative essentially in the absence of an activation catalyst, wherein the phenolic-resin curative is defined by the general formula (V)

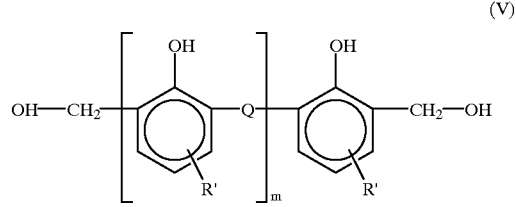
(V)

wherein Q is a divalent radical selected from the group consisting of —CH$_2$— and —CH$_2$—O—CH$_2$—; m is zero or a positive integer from 1 to 20 and R' is an organic radical; and continuing the masticating of the mixture at the curing temperature until the elastomer is cured.

BRIEF DESCRIPTION OF THE DRAWINGS

The Figure is a chart plotting vulcanization at 190° C. against time in minutes by using an oscillating disc rheometer. The increase in torque indicates the extent of vulcanization.

PREFERRED EMBODIMENT FOR CARRYING OUT THE INVENTION

The present invention is directed toward a vulcanizable elastomeric composition. The composition is surprisingly vulcanizable, within a reasonable time, in the absence of an activation catalyst. A molecule of the elastomer employed contains at least one pendent reactive amino group, and the curing agent is a poly-functional resin having at least two reactive sites. Without wishing to be bound by theory, it is believed that, upon vulcanization, the elastomers are cross-linked as a result of a substitution reaction between the curing agent and the reactive amino group of the elastomer. The composition should not contain too much of a constituent that would be deleterious to the vulcanization reaction. Likewise, each constituent should not contain too much of a substituent that would be deleterious to the vulcanization reaction.

As disclosed, the vulcanizable composition of the present invention is vulcanized in the absence of an activation catalyst. For purposes of this disclosure, the term activation catalyst will refer to metal oxide catalysts and Lewis-acid catalysts. The metal oxide commonly used by those of skill in the art includes, but is generally not limited to, zinc oxide; and the Lewis-acid catalysts commonly used include, but are not generally limited to, acid-acting metal halides such as boron trifloride, stannous chloride, zinc chloride, titanium tri- or tetrachloride, aluminum chloride, ferric chloride, ferric bromide, zinc bromide, aluminum bromide or complexes thereof.

A molecule of the elastomer of the present invention contains at least one pendent reactive amino group. For purposes of this disclosure, elastomers whose molecules each contain at least one pendent reactive amino group will be referred to as pendent-amino elastomers. The reactive amino group is typically incorporated into the elastomer molecule by copolymerization during the formation of the elastomer, but it may also be grafted onto the polymerized elastomer. The reactive amino group is defined according the general formula (I).

$$-Y_n-NH-R \qquad (I)$$

wherein R is a hydrogen atom or an organic radical having up to 20 carbon atoms such as an alkyl or alkenyl radical having up to 20 carbon atoms, an aryl or alkylaryl radical having up to 20 carbon atoms, or a nitrogen containing organic radical having up to 20 carbon atoms; and, wherein Y is a divalent organic radical and n is 0 or 1. Preferably, R is a nitrogen containing radical of the general formula (II).

$$-R^1-NH-R^2 \qquad (II)$$

wherein $R^1$ is selected from the group consisting of alkylene and arylene groups having up to 10 carbon atoms; and $R^2$ is selected from the group consisting of hydrogen, aryl and akyl groups having up to 10 carbon atoms. Preferably, Y is a divalent organic radical having up to 20 carbon atoms and more preferably up to 5 carbon atoms. Representative of organic radicals, which may be selected for Y, include, but are not limited to, methylene, ethylene, phenylene or a carbonyl group having the formula (III).

(III)

The elastomer itself typically contains some degree of unsaturation.

The preparation of one such pendent-amino elastomer is disclosed in U.S. Pat. Nos. 3,658,769 and 3,767,628. For example, the preparation of a butadiene-acrylonitrile-N-(4-anilinophenyl)methacrylamide terpolymer is disclosed. In this example, the pendant reactive amino group, derived from N-(4-anilinophenyl)methacrylamide, is defined by the general formula (IV).

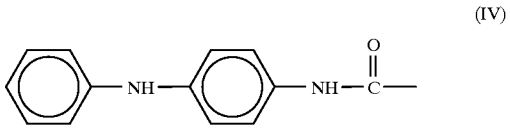

(IV)

This reactive amino group is a suitable reactive group according to the present invention.

It is believed that the commercially available products from the Goodyear Tire & Rubber Company, Akron, Ohio, sold under the tradename Chemigum® HR662, Chemigum® HR665, Chemigum® HR967 or Chemigum® HR765A are butadiene-acrylonitrile-N-(4-anilinophenyl) methacryl-amide terpolymers. The elastomers include those prepared by copolymerization as well as those prepared by grafting, such as those disclosed in U.S. Pat. Nos. 4,155,955 and 4,354,007.

Although the N-4-anilinophenyl)methacrylamide and N-(4-anilinophenyl)acrylamide-derived reactive amino groups are preferred, it should be understood that any reactive amino group, meeting the structural limitations as set forth above can be utilized for purposes of this invention. Therefore, the reactive amino group can include, but is not limited to, those derived from copolymerization or grafting of the following comonomers:

N-(4-anilinophenyl) acrylamide
N-(4-anilinophenyl) methacrylamide
N-(4-anilinophenyl) cinnamamide
N-(4-anilinophenyl) crotonamide
N-[4-(4-methylanilino) phenyl]acrylamide
N-[4-(4-methylanilino) phenyl]methacrylamide
N-[4-(4-methoxyanilino) phenyl]acrylamide
N-[4-(4-methoxyanilino) phenyl]methacrylamide
N-[4-(4-ethoxyanilino) phenyl]acrylamide
N-[4-(4-ethoxyanilino) phenyl]methacrylamide
N-[4-4-N,N-dimethylaminoanilino) phenyl]acrylamide
N-(4-anilinophenyl) maleamic acid
N-(4-anilinophenyl) itaconamic acid
N-[4-(4-methylanilino)phenyl]maleamic acid
N-(4-anilinophenyl) citraconamic acid
N-(4-anilinophenyl) maleimide
N-(4-anilinophenyl) itaconimide
N-(4-anilinophenyl) citraconimide
N-[4-(4-methylanilino) phenyl]maleimide
N-[4-(4-methylanilino) phenyl]itaconimide
N-[4-(4-methoxyanilino) phenyl]maleimide
N-[4-(4-methoxyanilino) phenyl]itaconimide
N-[4-(4-ethoxyanilino) phenyl]maleimide
N-[4-(4-ethoxyanilino) phenyl]itaconimide
N-[4-(4-ethoxyanilino) phenyl]citraconimide
N-(4-anilinophenyl) phenyl maleimide
N-[4-(4-N,N-dimethylaminoanilino) phenyl]maleimide When the reactive amino-group-containing monomers are copolymerized with elastomer-forming other monomers to form the pendent-amino elastomers of the present invention, the preferred other monomers are butadiene and acrylonitrile. These other elastomer-forming monomers, however, can include, but are not limited to isoprene, styrene, and isobutylene. As the reactive amino group may be grafted to the polymerized elastomer, the preferred elastomer to which such reactive amino group is grafted is butadiene-acrylonitrile, or nitrile rubber as it is commonly referred to. Other elastomers that can be modified to form pendentamine elastomers include, but are limited to styrene butadiene rubber (SBR), ethylene-propylene diene terpolymer (EPDM), polyisoprene, butyl rubber, isobutylene rubber (IIR), and acrylate rubbers. The molecular weights of these rubbers can be between 50,000 and 4,000,000, more preferably between 80,000 and 1,000,000 and still more preferably between 100,000 and 500,000.

The phenolic-resin curative employed in the present invention can be referred to as a resole, which is made by condensation of alkyl substituted phenol or unsubstituted phenol with aldehyde, preferably, formaldehyde, in a alkaline medium or by condensation of bi-functional phenoldialcohols. The alkyl substituents of the alkyl substituted phenols typically contain 1 to 10 carbon atoms. Dimethoylol phenols or phenolic resins, substituted in para-positions with alkyl groups containing 1 to 10 carbon atoms are preferred. These phenolic curatives are typically thermosetting resins and will be referred to as phenolic-resin curatives for purposes of this disclosure. As should be appreciated, the use of phenolic-resin curatives, having substituent halogenation is not necessary because the composition of the present invention is vulcanizable in the absence of an activation catalyst. In fact, it is preferred to employ a phenolic-resin curative that is essentially free of any substituent halogen atoms. An example of a preferred phenolic-resin curative is defined according to the general formula (V).

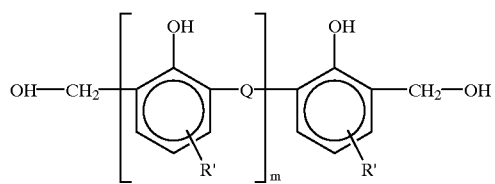

(V)

wherein Q is a divalent radical selected from the group consisting of —$CH_2$—, —$CH_2$—O—$CH_2$—; m is zero or a positive integer from 1 to 20 and R' is an organic radical. Preferably, Q is the divalent radical —$CH_2$—O—$CH_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms.

It is believed that the dimethylol-p-octylphenolic resin commercially available from Schenectady International, Schenectady, N.Y., under the name SP-1045 is a phenolic-resin curatives as described above and are essentially free of halogen substituents.

Surprisingly, the above described vulcanizing agents vulcanize the pendent-amino elastomers of the present invention without the presence of an activation catalyst. Heretofore in the art, unsaturated elastomers were required to be vulcanized in the presence of an activation catalyst to achieve vulcanization within a reasonable time. The necessary use of an activation catalyst is best demonstrated with reference to the Figure. A Monsanto oscillating disk type cure meter was employed to measure vulcanization (which is directly related to "Torque," a) of a pendent-amino elastomer and a non-pendent amino nitrile rubber. The elastomer employed, whose molecules contain pendent-amino groups, was Chemigum HR665; and the elastomer employed, whose molecules are believed to be essentially free of pendent-amino groups, was Chemigum M615B. Both elastomers are sold by the Goodyear Tire & Rubber Company. The curve labeled M615B represents the vulcanization Chemigum M615B and the curve labeled HR665 represents the vulcanization of Chemigum HR665. Both compounds were vulcanized without an activation catalyst by using the phenolic curative SP-1045. Sufficient vulcanization of the pendent-amino elastomer HR665 occurred within a reasonable time as is evidenced by the steep curve and high degree of ultimate cure, while the M615B elastomer did not achieve sufficient vulcanization without the use a catalyst.

As it should be understood, upon vulcanization, the composition of the pendent-amino elastomer and the curing agent of the present invention form a vulcanizate. Generally, sufficient cross-linking of the pendent-amino elastomer is achieved when about 2 to about 20 parts by weight per hundred parts by weight rubber (phr) of the curing agent of the present invention is used with the pendent-amino elastomer. Preferably, about 3 to about 16 phr, and even more preferably about 4 to about 12 phr, curing agent is used with the pendent-amino elastomer. Vulcanization occurs within a reasonable time, without the use of an activation catalyst, when the elastomer, mixed with the curing agent, is heated, preferable to a temperature of about 120 to about 240, and preferably more from about 150 to about 200.

It should be further understood that the pendent-amino elastomer of the present invention can be blended with a thermoplastic hard polymer or thermoplastic elastomer to form a thermoplastic vulcanizate. This thermoplastic vulcanizate can be achieved by dynamic vulcanization by using the vulcanizing agent of the present invention to cure the pendent-amino elastomer of the present invention.

For example, the pendent-amino elastomer of the present invention may be blended with a thermoplastic hard polymer or thermoplastic elastomer, either of which is not cross-linkable by the curative of the present invention, and the pendent-amino elastomer within the mixture subsequently vulcanized with the phenolic-resin curing agent of the present invention in the absence of an activation catalyst during molten state mixing. The thermoplastic hard polymer or thermoplastic elastomer, with which the pendent-amino elastomer is blended, can be any technologically compatible thermoplastic polymer or a thermoplastic elastomer which is immiscible with the elastomer. The term "technologically compatible" indicates that useful materials are formed by the blend. For purposes of this disclosure, the term thermoplastic polymer will be used to refer to either thermoplastic hard polymers or thermoplastic elastomers.

Specifically, those thermoplastic hard polymers that can be blended with the pendent-amino elastomers include, but are not limited to, polyolefins such as polyethylene, isotactic polypropylene, polybutylene terephthalate, and mixtures thereof. Further, technologically compatible thermoplastic elastomers include styrenic thermoplastic elastomers, thermoplastic urethanes and ester-ether block copolymers. Not all pendent-amino elastomers are necessarily technologically compatible with all of the thermoplastic hard polymers or thermoplastic elastomers. Each combination must be considered per se. Preferred among the thermoplastic elastomers is a polyester-ether elastomer such as that sold under the tradename HYTREL by DuPont de Nemours, E.I., Co., Wilmington, Del.

As discussed above, dynamic vulcanization is the cross-linking of an elastomeric polymer that is dispersed within a thermoplastic non-vulcanizing polymer while both polymers are undergoing mixing or masticating, such mixing or masticating being continued until vulcanization is complete. The pendent-amino elastomer and thermoplastic non-vulcanizing polymer are mixed at a temperature sufficient to soften the thermoplastic non-vulcanizing polymer or, more commonly, at a temperature above its melting point if the thermoplastic non-vulcanizing polymer is crystalline at ordinary temperatures. This mixing should form a homogeneous mixture wherein the rubber is in the form of small dispersed particles essentially of a size smaller than about 50 $\mu$m, preferably of a size smaller than about 25 $\mu$m and more preferably of a size smaller than about 10 $\mu$m or less. After the thermoplastic non-vulcanizing polymer and pendent-amino elastomer are intimately mixed, a vulcanizing amount of the phenolic-resin curative is added. Heating and masticating at vulcanization temperatures are generally adequate to complete the vulcanization reaction in a few minutes or less, but if shorter vulcanization times are desired, higher temperatures may be used. To obtain thermoplastic vulcanizates, it is important that mixing continues without interruption until vulcanization occurs. If appreciable curing is allowed after mixing has stopped, a thermoset unprocessable vulcanizate may be obtained.

For example, when Chemigum HR is vulcanized while dispersed within Hytrel, vulcanization typically occurs within the range from about 150° C. to about 220° C., preferably in the range from about 160° C. to about 200° C., and more preferably in the range from about 175° C. to about 195° C. Masticating and heating the mixture within these temperature ranges will typically produce a sufficiently vulcanized product within 0.25 to about 10 minutes. Of course, the vulcanization time can be reduced by increasing the temperature.

A vulcanizing amount of the phenolic-resin curative is added to the rubber-thermoplastic non-vulcanizing polymer mixture to obtain the thermoplastic vulcanizate of the present invention. Generally, a vulcanizing amount of phenolic-resin curative comprises about 2 to about 20 parts by weight per hundred parts by weight rubber and thermoplastic non-vulcanizing polymer, combined. The vulcanizing amount of phenolic-resin curative preferably comprises about 3 to about 16 parts by weight per hundred parts by weight rubber, and more preferably comprises about 4 to about 12 parts by weight per hundred parts by weight rubber and thermoplastic non-vulcanizing polymer, combined.

With regard to the mixture of pendent-amino elastomer and thermoplastic non-vulcanizing polymer, the mixture generally comprises about 20 to about 2000 parts by weight thermoplastic non-vulcanizing polymer per hundred parts by weight rubber. The mixture preferably comprises about 25 to about 250, and more preferably comprises about 30 to about 200, parts by weight of thermoplastic polymer per hundred parts by weight rubber. As should be evident from the foregoing disclosure, the use of the term rubber herein refers to the pendent-amino elastomer of the present invention and the use of the term thermoplastic non-vulcanizing polymer refers to either thermoplastic hard polymers which are not cross-linked during dynamic vulcanization or thermoplastic elastomers as disclosed herein, which also are not cross-linked during dynamic vulcanization. Based on the discussion herein, those skilled in the art will appreciate the appropriate quantities, extent of mixing time etc., required to carry out the vulcanization of the pendent-amino elastomer components selected. It should further be appreciated that a vulcanizate derived from a composition containing a pendent-amino elastomer in an amount greater than 30, or preferably 40, parts by weight per hundred parts by weight rubber and thermoplastic polymer, combined, will exhibit elastomeric properties.

In addition to the polymer components and resin curing agent, the vulcanizable thermoplastic elastomeric composition of the present invention can further include reinforcing and non-reinforcing fillers, antioxidants, stabilizers, rubber processing oils, lubricants, antiblocking agents, antistatic agents, waxes, coupling agents for the fillers, foaming agents, pigments, flame retardants, and other processing aids known in the art.

It should also be appreciated that methods other than dynamic vulcanization can be used to prepare the thermoplastic vulcanizate of the present invention. For example, the pendent-amino elastomer can be fully vulcanized in the absence of the thermoplastic resin, powered, and mixed with the thermoplastic resin, or thermoplastic elastomer, at a temperature above the melting or softening point of the thermoplastic resin, or thermoplastic elastomer. Furthermore, the thermoplastic vulcanizate can be achieved by simply blending the vulcanized pendent-amino elastomer with the thermoplastic resin, or thermoplastic elastomer, provided both are ground to sufficiently small particles. Accordingly, the term "particulate blend" herein means a mixture of well dispersed small particles of cross-linked pendent-amino elastomer and thermoplastic resin or thermoplastic elastomer, typically of about 50 $\mu$m or less, preferably of about 25 $\mu$m or less, more preferably about 10 $\mu$m or less, and still more preferably about 5 $\mu$m or less.

SPECIFIC EMBODIMENTS OF THE INVENTION

In order to demonstrate the practice of the present invention, four (4) thermoplastic vulcanizates where prepared and tested for hardness, tensile strength, ultimate elongation, and 100% modulus. Further tested was a commercial grade thermoplastic vulcanizate representing thermoplastic vulcanizates heretofore known in the art, and which is believed to have been dynamically vulcanized. The recipe for each thermoplastic vulcanizable composition yielding the thermoplastic vulcanizate is reported in TABLE I and the test results are reported in TABLE II.

The four thermoplastic vulcanizates were made by the following method. The elastomer Chemigum HR665 was heated to 190° C. in a Brabendar® mixing head, fitted with cam-type rotors, at a speed of 80 r.p.m., while the thermoplastic polyester elastomer Hytrel G4074 was added. The composition was mixed for a 4 minute period. IRGONOX-1010, an antioxidant available from the Ciba-Geigy Corporation, Greensboro, N.C., was also added at this time. The curing agent SP-1045 was then slowly added and the composition mixed under high shear at 190° until complete vulcanization. When used, the activation catalysts were added subsequent to the curing agent.

TABLE I

| Recipes of Compositions for Dynamic Vulcanization | | | | |
|---|---|---|---|---|
| | Ex. 1 | Ex. 2 | Ex. 3 | Ex.4 |
| Chemigum HR 665 | — | 100 | 100 | 100 |
| Chemigum HR 662 | 100 | — | — | — |
| HYTREL G4074 (phr) | 66.7 | 66.7 | 66.7 | 66.7 |
| SP 1045 (phr) | 10.0 | 10.0 | 10.0 | 10.0 |
| IRGANOX 1010 (phr) | 0.5 | 0.5 | 0.5 | 0.5 |
| SnCl$_2$.2H$_2$O (phr) | — | — | 1 | — |
| ZnO (phr) | — | — | — | 10 |

The hardness of the thermoplastic vulcanizates of Examples 1–4 was tested using ASTM test method D-2240-91 at 25° C. for 5 seconds using a durometer. The tensile strength, ultimate elongation, and 100% modulus of the thermoplastic vulcanizates of Examples 1–4 was tested using ASTM test D-412-92 at 25° C. using a Monsanto T10 Universal Testing Machine.

True stress at break (TSB) is the tensile strength at break multiplied by the extension ratio at break. Tensile strength at break was calculated as described above, and the extension ratio at break was calculated as the sum of 1.00 plus one-one hundredth (1/100) of the percent ultimate elongation.

TABLE II

Mechanical Properties of Thermoplastic Vulcanizates

| Properties | Ex. 1 | Ex. 2 | Ex. 3 | Ex. 4 | Santoprene ® |
|---|---|---|---|---|---|
| Hardness (Shore A) | 70A | 70A | — | — | 73A |
| Tensile Strength (MPa) | 10.5 | 8.8 | 7.92 | 7.30 | 8.3 |
| Ultimate Elongation (%) | 450 | 470 | 400 | 350 | 375 |
| Modulus @ 100% (MPa) | 2.3 | 2.0 | 2.2 | 2.0 | 3.2 |
| True Stress at Break | 58 | 50 | 40 | 33 | 40 |

TABLE II demonstrates that not only was the thermoplastic vulcanizable composition of the present invention sufficiently vulcanized without the presence of an activation catalyst, but that the practice of the present invention also produced a thermoplastic vulcanizate surprisingly superior to that using an activation catalyst. Particularly, the true stress at break for Example 1 is 31% greater than that of Example 3 and 43% greater than that of Example 4. Likewise, the true stress at break for Example 2 is 20% greater than that of Example 3 and 34% greater than that of Example 4. The increase in true stress at break demonstrates that the thermoplastic vulcanizates have increased toughness and require increased amounts of energy for rupture.

It should be understood that the thermoplastic vulcanizate of the present invention is an improvement over the existing art, as is the method of vulcanizing the elastomer containing the pendant amino group in the absence of an activation catalyst and the vulcanized composition resulting from such vulcanization. It should also be appreciated that the vulcanized pendent-amino elastomer or thermoplastic vulcanizate of the present invention can have a multitude of uses. Namely, these thermoplastic vulcanizates are both heat and oil resistant, and they exhibit mechanical properties which are believed to be superior over the prior art due to the novel vulcanization employed. As such, the thermoplastic vulcanizates can be utilized within rubber goods such as, but not limited to, gaskets, seals, bumpers, oil-well injection lines, vacuum tubing and seals, hydraulic lines and wire cable insulation, and the like. The pendent-amino elastomer, or the vulcanized elastomer in the absence of thermoplastic polymer, according to the present invention can be utilized in, without limiting the use thereto, such applications as hydraulic hose, fuel hose, lip seals, diaphragms, o-rings, coolant gaskets, oil-well equipment or compressor valves.

Based upon the foregoing disclosure, it should now be apparent that the vulcanizable compositions, vulcanizate, thermoplastic vulcanizate, and method of vulcanizing as described herein will carry out the objects of the invention set forth hereinabove. It is, therefore, to be understood that any obvious variations fall within the scope of the claimed invention and thus, the selection of specific constituents and substituents can be determined without departing from the spirit of the invention herein disclosed and described. In particular, elastomers according to the present invention are not necessarily limited to those having a N-(4-anilinophenyl)methacrylamide-derived pendant group. Moreover, as noted hereinabove, other curatives meeting the broad specifications defined above can be substituted for the phenolic resin. Thus, the scope of the invention shall include all modifications and variations that may fall within the scope of the attached claims.

What is claimed is:

1. A vulcanizable composition of matter comprising:

an elastomer, the molecules of said elastomer having at least one reactive amino group pendent from their backbone chains and having the general formula (I)

$$-Y_n-NH-R \qquad (I)$$

wherein R is selected from the group consisting of hydrogen, and organic radicals having up to 20 carbon atoms, and wherein Y is a divalent organic radical and n is zero or 1; and a vulcanizing amount of a phenolic-resin curative of the general formula (V)

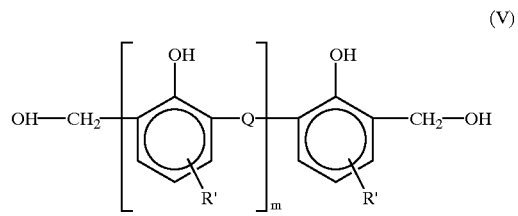

wherein Q is a divalent radical selected from the group consisting of —CH$_2$— and —CH$_2$—O—CH$_2$—; m is zero or a positive integer from 1 to 20 and R' is an organic radical, wherein the composition is essentially devoid of an activation catalyst.

2. A vulcanizable composition of matter, as set forth in claim 1, wherein R is selected from the group consisting of alkyl and alkenyl radicals having up to 20 carbon atoms, aryl and alkylaryl radicals having up to 20 carbon atoms, and nitrogen containing organic radicals having up to 20 carbon atoms.

3. A vulcanizable composition of matter, as set forth in claim 1, wherein Y has up to 20 carbon atoms.

4. A vulcanizable composition of matter, as set forth in claim 3, wherein Y is a carbonyl group.

5. A vulcanizable composition of matter, as set forth in claim 1, wherein said reactive amino group is formed by using monomers selected from the group consisting of N-(4-anilinophenyl) acrylamide, N-(4-anilinophenyl) methacrylamide, N-(4-anilinophenyl) cinnamamide, N-(4-anilinophenyl) crotonamide, N-[4-(4-methylanilino) phenyl]acrylamide, N-[4-(4-methylanilino) phenyl] methacrylamide, N-[4-(4-methoxyanilino) phenyl] acrylamide, N-[4-(4-methoxyanilino) phenyl] methacrylamide, N-[4-(4-ethoxyanilino) phenyl] acrylamide, N-[4-(4-ethoxyanilino) phenyl] methacrylamide, N-[4-(4-N,N-dimethylaminoanilino) phenyl]acrylamide, N-(4-anilinophenyl) maleamic acid, N-(4-anilinophenyl) itaconamic acid, N-[4-(4-methylanilino)phenyl]maleamic acid, N-(4-anilinophenyl) citraconamic acid, N-(4-anilinophenyl) maleimide, N-(4-anilinophenyl) itaconimide, N-(4-anilinophenyl) citraconimide, N-[4-(4-methylanilino) phenyl]maleimide, N-[4-(4-methylanilino) phenyl]itaconimide, N-[4-(4-methoxyanilino) phenyl]maleimide, N-[4-(4-methoxyanilino) phenyl]itaconimide, N-[4-(4-ethoxyanilino) phenyl]maleimide, N-[4-(4-ethoxyanilino) phenyl]itaconimide, N-[4-(4-ethoxyanilino) phenyl] citraconimide, N-(4-anilinophenyl) phenyl maleimide, and N-[4-(4-N,N-dimethylaminoanilino) phenyl]maleimide.

13

6. A vulcanizable composition of matter, as set forth in claim 1, wherein said reactive amino group is defined according to the formula (IV)

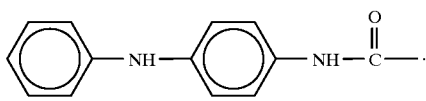

(IV)

7. A vulcanizable composition of matter, as set forth in claim 1, wherein said elastomer is a butadiene-acrylonitrile-N-(4-anilinophenyl)methacrylamide terpolymer.

8. A vulcanizable composition of matter, as set forth in claim 1, wherein said phenolic-resin curative is a resole single-stage resin.

9. A vulcanizable composition of matter, as set forth in claim 1, wherein said vulcanizing amount of phenolic-resin curative comprises about 2 to about 20 parts by weight per hundred parts by weight elastomer.

10. A method of vulcanizing an elastomer essentially in the absence of an activation catalyst comprising the step of blending the elastomer with a vulcanizing amount of a phenolic-resin curative essentially in the absence of an activation catalyst; the molecules of the elastomer containing at least one pendent reactive amino group of the general formula (I)

—$Y_n$—NH—R     (I)

wherein R is selected from the group consisting of hydrogen, and organic radicals having up to 20 carbon atoms, and wherein Y is a divalent organic radical and n is zero or 1; and the phenolic-resin curative is defined according the formula (V)

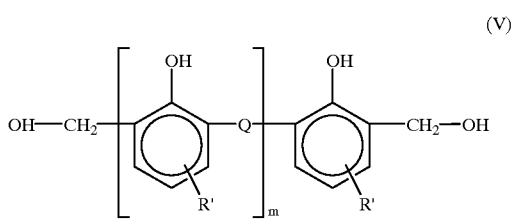

(V)

wherein Q is a divalent radical selected from the group consisting of —$CH_2$— and —$CH_2$—O—$CH_2$—; and m is zero or a positive integer from 1 to 20 and R' is an organic radical.

11. A method, as set forth in claim 10, wherein R is selected from the group consisting of alkyl and alkenyl radicals having up to 20 carbon atoms, aryl and alkylaryl radicals having up to 20 carbon atoms, and nitrogen containing organic radicals having up to 20 carbon atoms.

12. A method, as set forth in claim 10, wherein said reactive amino group is formed by using monomers selected from the group consisting of N-(4-anilinophenyl) acrylamide, N-(4-anilinophenyl) methacrylamide, N-(4-anilinophenyl) cinnamamide, N-(4-anilinophenyl) crotonamide, N-[4-(4-methylanilino) phenyl]acrylamide, N-[4-(4-methylanilino) phenyl]methacrylamide, N-[4-(4-methoxyanilino) phenyl]acrylamide, N-[4-(4-methoxyamino) phenyl]methacrylamide, N-[4-(4-ethoxyanilino) phenyl]acrylamide, N-[4-(4-ethoxyanilino) phenyl]methacrylamide, N-[4-(4-N,N-dimethylaminoanilino) phenyl]acrylamide, N-(4-anilinophenyl) maleamic acid, N-(4-anilinophenyl) itacon-

14 amic acid, N-[4-(4-methylanilino)phenyl]maleamic acid, N-(4-anilinophenyl) citraconamicacid, N-(4-anilinophenyl) maleimide, N-(4-anilinophenyl) itaconimide, N-(4-anilinophenyl) citraconimide, N-[4-(4-methylanilino) phenyl]maleimide, N-[4-(4-methylanilino) phenyl] itaconimide, N-[4-(4-methoxyanilino) phenyl]maleimide, N-[4-(4-methoxyanilino) phenyl]itaconimide, N-[4-(4-ethoxyanilino) phenyl]maleimide, N-[4-(4-ethoxyanilino) phenyl]itaconimide, N-[4-(4-ethoxyanilino) phenyl] citraconimide, N-(4-anilinophenyl) phenyl maleimide, and N-[4-(4-N,N-dimethylaminoanilino) phenyl]maleimide.

13. A method, as set forth in claim 10, wherein the reactive amino group is defined according to the formula (IV)

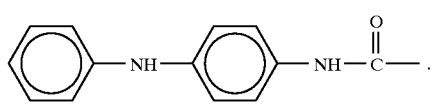

(IV)

14. A method, as set forth in claim 10, wherein the elastomer is a butadiene-acrylonitrile-N-(4-anilinophenyl) methacrylamide terpolymer.

15. A method, as set forth in claim 10, wherein said vulcanizing amount of phenolic-resin curative comprises about 2 to about 20 parts by weight per hundred parts by weight elastomer.

16. A vulcanizate prepared by the step of:
vulcanizing at least one elastomer, the molecules of said elastomer having at least one pendent reactive amino group of the general formula (I)

—$Y_n$—NH—R     (I)

wherein R is selected from the group consisting of hydrogen, and organic radicals having up to 20 carbon atoms, and wherein Y is a divalent organic radical and n is zero or 1 with
a vulcanizing amount of a vulcanizing agent having the general formula (V)

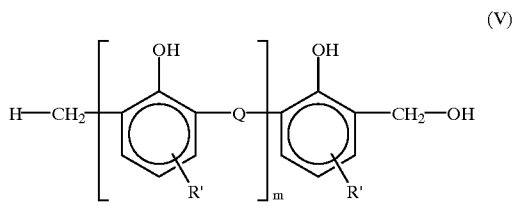

(V)

wherein Q is a divalent radical selected from the group consisting of —$CH_2$— and —$CH_2$—O—$CH_2$—; m is zero or a positive integer from 1 to 20 and R' is an organic radical, wherein said step of vulcanizing occurs essentially in the absence of an activation catalyst.

17. A vulcanizate, as set forth in claim 16, wherein R is selected from the group consisting of alkyl and alkenyl radicals having up to 20 carbon atoms, aryl and alkylaryl radicals having up to 20 carbon atoms, and nitrogen containing organic radicals having up to 20 carbon atoms.

18. A vulcanizate, as set forth in claim 16, wherein said reactive amino group is formed by using monomers selected from the group consisting of N-(4-anilinophenyl) acrylamide, N-(4-anilinophenyl) methacrylamide, N-(4-anilinophenyl) cinnamamide, N-(4-anilinophenyl) crotonamide, N-[4-(4-methylanilino) phenyl]acrylamide, N-[4-(4-methylanilino) phenyl]methacrylamide, N-[4-(4-methoxyanilino) phenyl]acrylamide, N-[4-(4-methoxyanilino) phenyl]methacrylamide, N-[4-(4-ethoxyanilino) phenyl]acrylamide, N-[4-(4-ethoxyanilino) phenyl]methacrylamide, N-[4-(4-N,N-dimethylaminoanilino) phenyl]acrylamide, N-(4-anilinophenyl) maleamic acid, N-(4-anilinophenyl) itaconamic acid, N-[4-(4-methylanilino)phenyl]maleamic acid, N-(4-anilinophenyl) citraconamic acid, N-(4-anilinophenyl) maleimide, N-(4-anilinophenyl) itaconimide, N-(4-anilinophenyl) citraconimide, N-[4-(4-methylanilino) phenyl]maleimide, N-[4-(4-methylanilino) phenyl] itaconimide, N-[4-(4-methoxyanilino) phenyl]maleimide, N-[4-(4-methoxyanilino) phenyl]itaconimide, N-[4-(4-ethoxyanilino) phenyl]maleimide, N-[4-(4-ethoxyanilino) phenyl]itaconimide, N-[4-(4-ethoxyanilino) phenyl] citraconimide, N-(4-anilinophenyl) phenyl maleimide, and N-[4-(4-N,N-dimethylaminoanilino) phenyl]maleimide.

19. A vulcanizate, as set forth in claim 16, wherein said reactive amino group is defined according to the formula (IV)

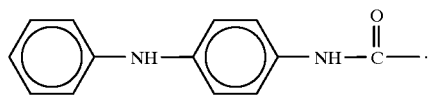

(IV)

20. A vulcanizate, as set forth in claim 16, wherein said elastomer is a butadiene-acrylonitrile-N-(4-anilinophenyl) methacrylamide terpolymer.

21. A vulcanizate, as set forth in claim 16, wherein said vulcanizing amount of phenolic-resin curative comprises about 2 to about 20 parts by weight per hundred parts by weight elastomer.

22. A thermoplastic vulcanizate prepared by the steps of:
preparing a rubber-thermoplastic blend comprising
a vulcanizable elastomer, the molecules of said elastomer having at least one pendent reactive amino group of the general formula (I)

—Y$_n$—NH—R  (I)

wherein R is selected from the group consisting of hydrogen, and organic radicals having up to 20 carbon atoms, and wherein Y is a divalent organic radical and n is zero or 1,
a thermoplastic non-vulcanizing polymer; and,
a vulcanizing amount of a phenolic-resin curative of the general formula (V)

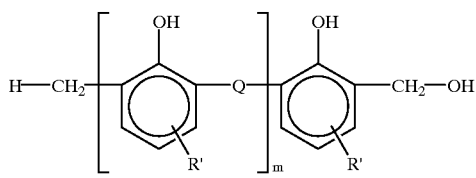

(V)

wherein Q is a divalent radical selected from the group consisting of —CH$_2$— and —CH$_2$—O—CH$_2$—; m is zero or a positive integer from 1 to 20 and R' is an organic radical; and, vulcanizing the elastomer essentially in the absence of an activation catalyst.

23. A thermoplastic vulcanizate, as set forth in claim 22, wherein R is selected from the group consisting of alkyl and alkenyl radicals having up to 20 carbon atoms, aryl and alkylaryl radicals having up to 20 carbon atoms, and nitrogen containing organic radicals having up to 20 carbon atoms.

24. A thermoplastic vulcanizate, as set forth in claim 22, wherein said reactive amino group is formed by using monomers selected from the group consisting of N-(4-anilinophenyl) acrylamide, N-(4-anilinophenyl) methacrylamide, N-(4-anilinophenyl) cinnamamide, N-(4-anilinophenyl) crotonamide, N-[4-(4-methylanilino) phenyl]acrylamide, N-[4-(4-methylanilino) phenyl] methacrylamide, N-[4-(4-methoxyanilino) phenyl] acrylamide, N-[4-(4-methoxyanilino) phenyl] methacrylamide, N-[4-(4-ethoxyanilino) phenyl] acrylamide, N-[4-(4-ethoxyanilino) phenyl] methacrylamide, N-[4-(4-N,N-dimethylaminoanilino) phenyl]acrylamide, N-(4-anilinophenyl) maleamic acid, N-(4-anilinophenyl) itaconamic acid, N-[4-(4-methylanilino)phenyl]maleamic acid, N-(4-anilinophenyl) citraconamic acid, N-(4-anilinophenyl) maleimide, N-(4-anilinophenyl) itaconimide, N-(4-anilinophenyl) citraconimide, N-[4-(4-methylanilino) phenyl]maleimide, N-[4-(4-methylanilino) phenyl]itaconimide, N-[4-(4-methoxyanilino) phenyl]maleimide, N-[4-(4-methoxyanilino) phenyl]itaconimide, N-[4-(4-ethoxyanilino) phenyl]maleimide, N-[4-(4-ethoxyanilino) phenyl]itaconimide, N-[4-(4-ethoxyanilino) phenyl] citraconimide, N-(4-anilinophenyl) phenyl maleimide, and N-[4-(4-N,N-dimethylaminoanilino) phenyl]maleimide.

25. A thermoplastic vulcanizate, as set forth in claim 22, wherein said reactive amino group is defined according to the formula (IV)

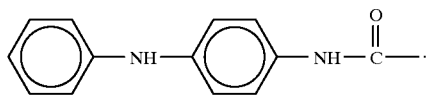

(IV)

26. A thermoplastic vulcanizate, as set forth in claim 22, wherein said elastomer is a butadiene-acrylonitrile-N-(4-anilinophenyl)methacrylamide terpolymer.

27. A thermoplastic vulcanizate, as set forth in claim 26, wherein Y is a carbonyl group.

28. A thermoplastic vulcanizate, as set forth in claim 22, wherein Y has up to 20 carbon atoms.

29. A thermoplastic vulcanizate, as set forth in claim 22, wherein said rubber-thermoplastic mixture comprises between about 20 to about 2000 parts by weight thermoplastic non-vulcanizing polymer per hundred parts by weight elastomer.

30. A thermoplastic vulcanizate, as set forth in claim 22, wherein said vulcanizing amount of phenolic-resin curative comprises about 2 to about 20 parts by weight per hundred parts by weight elastomer and thermoplastic polymer, combined.

31. A thermoplastic vulcanizate, as set forth in claim 22, where in the thermoplastic vulcanizate has been cross-linked essentially in the absence of an activation catalyst employing dynamic vulcanization.

32. A process for preparing a thermoplastic vulcanizate comprising the steps of:
masticating a mixture of thermoplastic non-vulcanizing polymer and elastomer, the mixture containing between about 20 and about 2000 parts by weight thermoplastic non-vulcanizing polymer per hundred parts by weight rubber at a temperature sufficient to soften or melt the thermoplastic non-vulcanizing polymer, and for a time sufficient to obtain a homogeneous mixture in which the rubber is in the form of small dispersed particles essentially of a size smaller than about 50 μm wherein the molecules of said elastomer have at least one pendent reactive amino group of the general formula $$—Y_n—NH—R \qquad (I)$$

wherein R is selected from the group consisting of hydrogen, and organic radicals having up to 20 carbon atoms, and wherein Y is a divalent organic radical and n is zero or 1;

adding to the mixture a vulcanizing amount of phenolic-resin curative essentially in the absence of an activation catalyst, wherein the phenolic-resin curative is defined by the general formula (V)

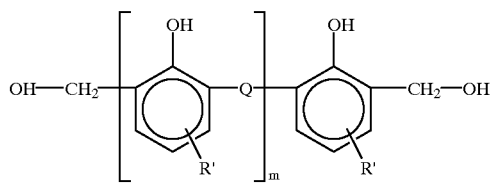

wherein Q is a divalent radical selected from the group consisting of —CH$_2$— and —CH$_2$—O—CH$_2$—; m is zero or a positive integer from 1 to 20 and R' is an organic radical; and continuing said masticating of the mixture at the curing temperature until the elastomer is cured.

* * * * *